(12) United States Patent
Wiederin et al.

(10) Patent No.: US 8,627,457 B2
(45) Date of Patent: Jan. 7, 2014

(54) INTEGRATED SECURITY SYSTEM

(75) Inventors: Shawn E. Wiederin, Cedar Rapids, IA (US); Ralph S. Hoefelmeyer, Colorado Springs, CO (US); Theresa E. Phillips, Fairfax, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3260 days.

(21) Appl. No.: 10/608,137

(22) Filed: Jun. 30, 2003

(65) Prior Publication Data

US 2004/0268147 A1 Dec. 30, 2004

(51) Int. Cl.
*H04L 29/06* (2006.01)

(52) U.S. Cl.
USPC .................... 726/22; 726/23; 726/24; 726/25

(58) Field of Classification Search
None
See application file for complete search history.

(56) References Cited

U.S. PATENT DOCUMENTS

| | | | |
|---|---|---|---|
| 6,519,703 B1 * | 2/2003 | Joyce | 726/22 |
| 6,785,732 B1 * | 8/2004 | Bates et al. | 709/232 |
| 6,941,467 B2 * | 9/2005 | Judge et al. | 726/22 |
| 2002/0087882 A1 * | 7/2002 | Schneier et al. | 713/201 |
| 2003/0145228 A1 * | 7/2003 | Suuronen et al. | 713/201 |

* cited by examiner

*Primary Examiner* — Benjamin Lanier (57) ABSTRACT

A network device used to provide network security includes an interface configured to receive data transmitted over a network. The network device also includes a firewall, intrusion detection logic and forwarding logic. The firewall, intrusion detection logic and forwarding logic process the received data to determine whether the data contains malicious content. When the data contains malicious content, the data may be dropped before it reaches a user device to which the received data was sent. Optionally, the network device may interact with an external device in order to make the forwarding decision. In addition, the network device may subscribe to services offered by the external device to receive updated security information.

17 Claims, 5 Drawing Sheets

INTEGRATED SECURITY SYSTEM

FIELD OF THE INVENTION

The present invention relates generally to security systems and, more particularly, to providing an integrated security system for users receiving and transmitting information via a network.

BACKGROUND OF THE INVENTION

The number of user communicating over public networks, such as the Internet, has increased significantly over the last several years. As a result, companies are providing more products and services over the Internet. Customers may access these products/services using a personal computer (PC). The customer's PC may include anti-virus software that protects the PC from malicious viruses.

One problem with using conventional commercial off the shelf anti-virus software is that such software is often unable to detect sophisticated attacks and/or prevent unauthorized users from accessing personal data stored on the customer's PC. In addition, the use of non-PC based devices, such as network appliances, televisions, etc., to access products/services via the Internet has become increasingly common. Typically, these non-PC based devices include no security mechanisms to combat viruses or other malicious attacks. Therefore, the customer is often left unprotected when accessing products/services over the Internet.

SUMMARY OF THE INVENTION

There exists a need for systems and methods that provide security for users accessing a public network.

These and other needs are met by the present invention where an integrated security device may be connected to an Internet access device to provide security features. The security device may be modular and may perform a number of security functions to provide/enhance security.

According to one aspect of the invention, a device including at least one interface, a firewall, intrusion detection logic and forwarding logic is provided. The interface is configured to receive data transmitted via a network and the firewall is configured to receive data from the interface. The firewall is also configured to determine whether the data potentially contains malicious content and identify first data in the received data that potentially contains malicious content. The intrusion detection logic is configured to receive the first data and generate report information based on the first data. The forwarding logic is configured to receive the report information and determine whether to forward the first data for processing by a user application based on the report information.

Another aspect of the present invention provides a computer-readable medium having stored instructions which when executed by a processor, cause the processor to receive data transmitted via a network and receive at least one set of rules from an external device, where the at least one set of rules is associated with processing the received data. The instructions also cause the processor to determine whether the data may contain malicious content using a first set of rules and identify first data that may contain malicious content based on the determining. The instructions further cause the processor to determine whether to forward the first data to a user device based on a second set of rules.

A further aspect of the present invention provides a method for providing security information to a number of user devices. The method includes storing, by a security provider, rules-based security information. The method also includes providing, by the security provider, a number of subscription levels, where each subscription level is associated with a different security level and has a different set of rules-based security information. The method further includes, downloading, by the security provider, a first set of rules-based security information to a first one of the user devices. The downloading is performed in response to at least one of a request from the first user device and a subscription associated with the first user device.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide a network security device that integrates a number of security functions in a modular unit. The security services/processing performed by the network security device may include, for example, firewall services, intrusion detection services, data forwarding services and virtual private network (VPN) related processing.

Exemplary System

Figure 1:
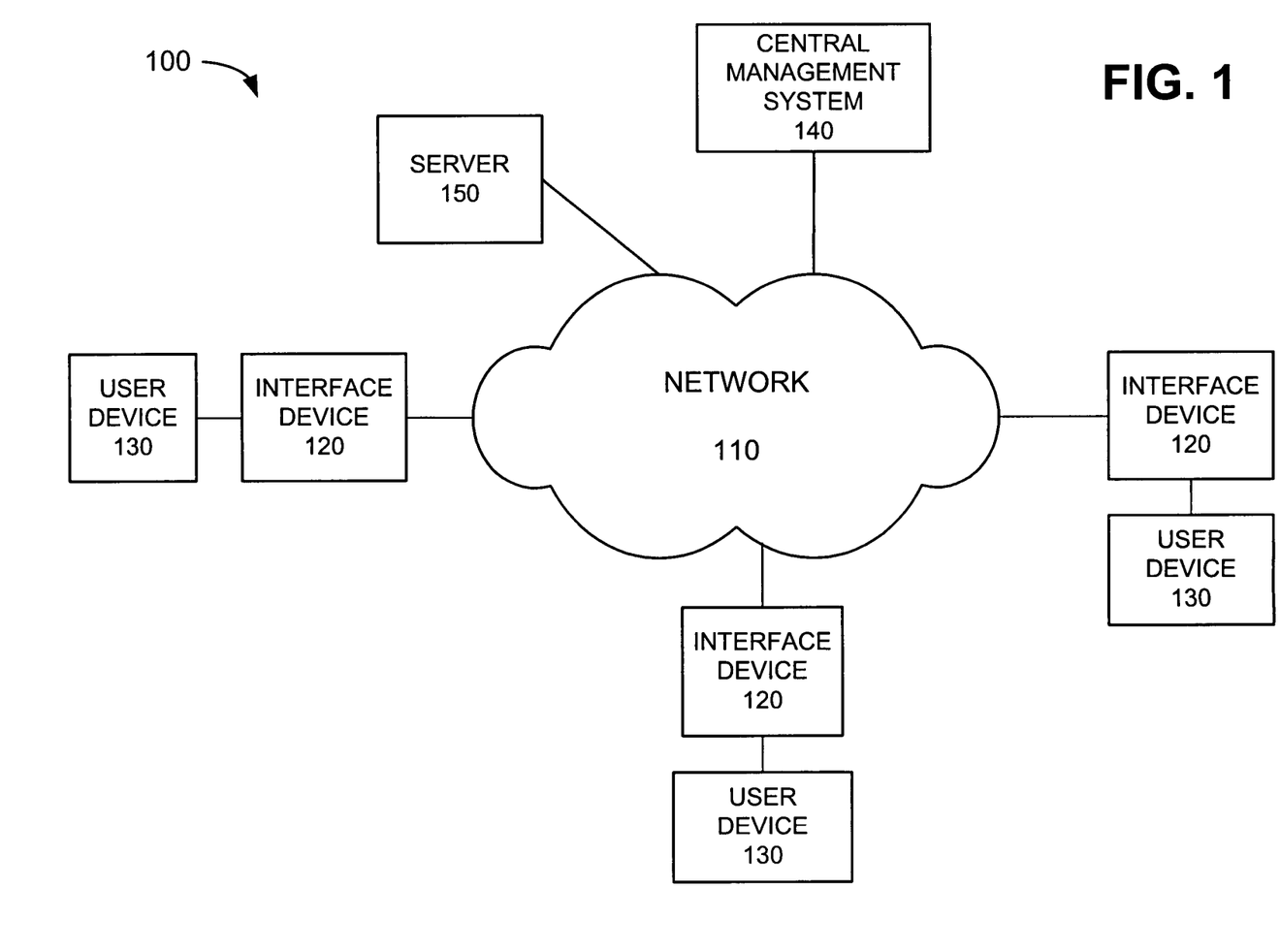
FIG. 1 is a block diagram of an exemplary system in which methods and systems consistent with the present invention may be implemented.

FIG. 1 illustrates an exemplary system 100 in which methods and systems consistent with the present invention may be implemented. In FIG. 1, system 100 includes a network 110 that interconnects a group of user devices 130, a central management system (CMS) 140 and a server 150. As illustrated in FIG. 1, each user device 130 is coupled to network 110 via an interface device 120. Each interface device 120 may provide security-related processing for its respective user device 130, as described in more detail below. While interface device 120 is illustrated as being connected to a single user device 130, it will be appreciated that interface device 120 may connect to and provide security-related processing for more than one user device 130. The number of devices illustrated in FIG. 1 is provided for simplicity. It will be appreciated that a typical system may include more or fewer devices than illustrated in FIG. 1. Moreover, system 100 may include additional devices (not shown) that aid in the transfer, processing, and/or reception of data.

Network 110 may include, for example, the Internet, an intranet, a local area network (LAN), a metropolitan area network (MAN), a wide area network (WAN), a public switched telephone network (PSTN), and/or some other similar type of network that is capable of transmitting data, such as voice and data communications. In fact, network 110 may include any type of network or combination of networks that permits routing of information from a particular source to a particular destination.

Interface device 120 may be a modular device that provides security-related processing for user device 130. Interface device 120, consistent with the present invention, may provide firewall processing, intrusion detection processing, data forwarding processing, VPN-related processing, etc., as described in more detail below. Interface device 120 may connect to network 110 via any conventional technique, such as wired, wireless, or optical connections.

Figure 2:
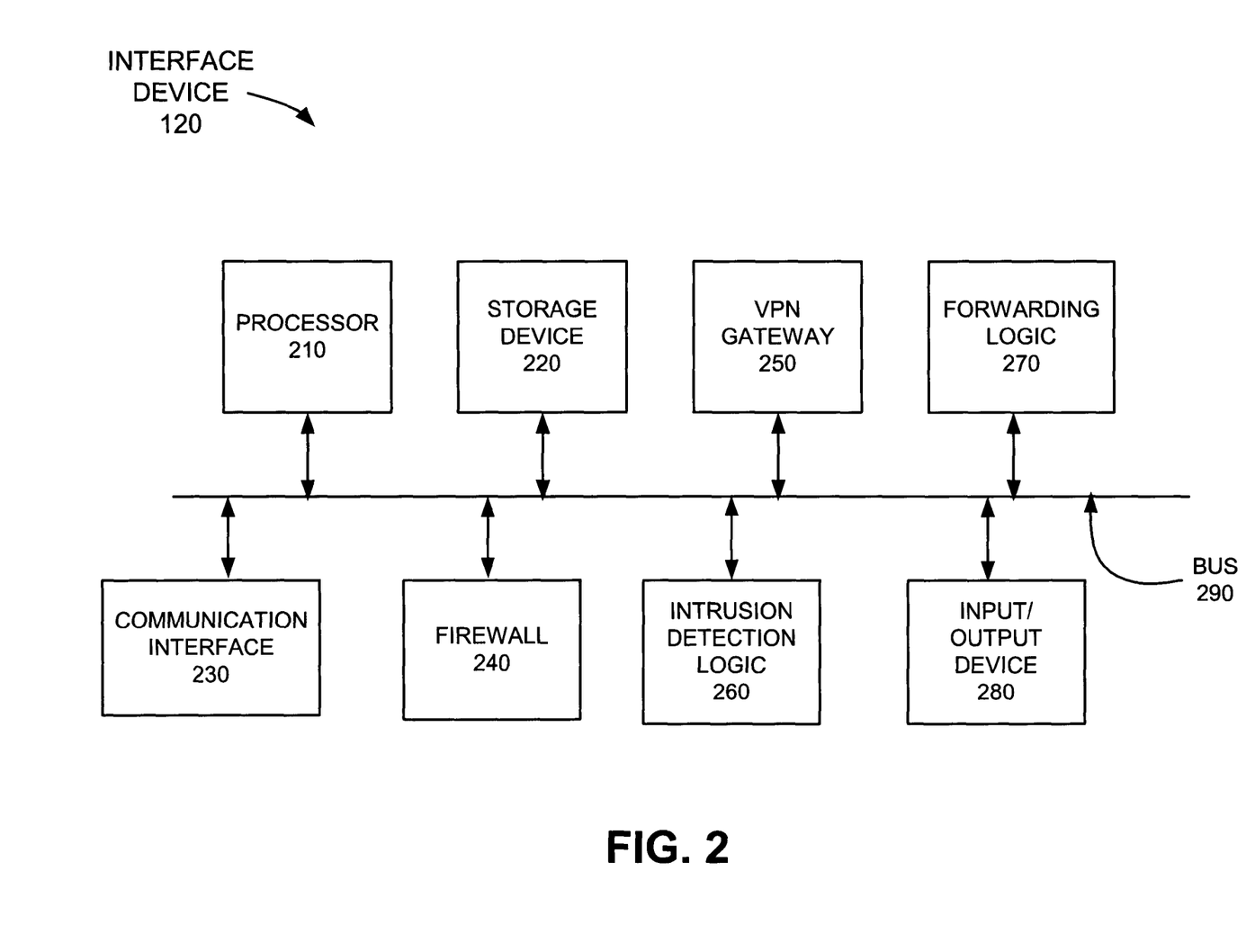
FIG. 2 illustrates an exemplary configuration of an interface device of FIG. 1 in an implementation consistent with the present invention.

FIG. 2 illustrates an exemplary configuration of interface device 120 of FIG. 1 in an implementation consistent with the present invention. As illustrated in FIG. 2, interface device 120 includes a processor 210, a storage device 220, a communication interface 230, a firewall 240, a virtual private network (VPN) gateway 250, intrusion detection logic 260, forwarding logic 270, an input/output device 280 and a bus 290. Bus 290 may include one or more conventional buses that permit communication among the components of interface device 120. It will be appreciated that the interface device 120 may include other components (not shown) that aid in receiving, processing, and/or transmitting data.

Processor 210 may include any type of conventional processor or microprocessor that interprets and executes instructions. Storage device 220 may include a random access memory (RAM) or another type of dynamic storage device that stores information and instructions for execution by processor 210. Storage device 220 may also be used to store temporary variables or other intermediate information during execution of instructions by processor 210. Storage device 220 may also include a read only memory (ROM) device and/or another type of static storage device that stores static information and instructions for processor 210. Storage device 220 may further include a magnetic disk or optical disk and its corresponding drive and/or some other type of magnetic or optical recording medium and its corresponding drive for storing information and/or instructions. In an exemplary implementation consistent with the present invention, processor 210 may execute operating system software stored in storage device 220. The operating system may provide the platform for integrating the various components/modules of interface device 120 and enable interface device 120 to manage, configure and provision services in real-time or near real-time.

Communication interface 230 may include any transceiver-like mechanism that enables interface device 120 to communicate with other devices and/or systems, such as user device 130 and network 110. For example, communication interface 230 may include a modem or an Ethernet interface to a network. Communication interface 230 may also include an application programming interface (API) that provides an interface between interface device 120 (e.g., the operating system being executed by processor 210) and an application program being executed by user device 130. Any conventional API may be used based on the particular system's requirements and/or the particular application program being executed by user device 130. Communication interface 230 may present a received data stream to user device 130 via the API. Alternatively, communication interface 230 may include other mechanisms for communicating via a data network.

Firewall 240 provides packet filtering capabilities for interface device 120. In one implementation, this filtering may be based on a set of rules that causes firewall 240 to perform an action on incoming traffic based on, for example, the Internet Protocol (IP) source address, IP destination address, and/or other fields/information included in the data stream. For example, firewall 240 may permit the received traffic to be forwarded to user device 130 or may drop or block the traffic from reaching user device 130 when the incoming traffic fails to satisfy the set of rules stored by firewall 240. Firewall 240 may also include an anti-virus module that scans the incoming data streams for viruses. The anti-virus module may use signature-based rules or heuristic-based techniques to detect a virus. Firewall 240 may also detect other forms of malicious content or unwanted data. The term "malicious content" may encompass, for example, unsolicited messages or e-mails, also referred to as "spam," and other types of malicious data, such as viruses. Firewall 240 may use conventional techniques to detect spam or similar information received by interface device 120 and may also discard this type of unwanted data.

Firewall 240, consistent with the present invention, may also apply different sets of rules based on the particular type of data it receives (e.g., video data, music data, etc.), the particular type of application being executed by user device 130, the provider of the received data (i.e., the source) or other factors. Firewall 240 may receive the rules from an external device, such as CMS 140. CMS 140, consistent with the present invention, may provide the particular rules to interface device 120 on a subscription basis. That is, a user associated with user device 130 and interface device 120 may subscribe to security services with CMS 140, as described in more detail below.

VPN gateway 250 may include logic for setting up secure tunnels to other devices in system 100 over network 110, such as CMS 140. VPN gateway 250 may encrypt data for transmission over the secure tunnel. VPN gateway 250 may also decrypt encrypted payloads and assemble the decrypted payloads for use by other devices in interface device 120, such as firewall 240.

Intrusion detection logic 260 may receive information from other devices in interface device 120 indicating the detection of anomalous events. For example, intrusion detection logic 260 may receive data packets from firewall 240 which match a particular viral signature. Intrusion detection logic 260 may correlate the data packets to the particular viral signatures and provide a normalized, filtered report for use by other devices/systems. For example, intrusion detection logic 260 may provide a report that indicates the number of packets, number of bytes, source address, destination address, etc., associated with the anomalous packets that match the viral signature. Intrusion detection logic 260 may also take the incoming data streams and correlate events associated with the data streams into a normalized or standardized form. For example, all events associated with the data streams may be stored in a database utilizing uniform records and fields.

Intrusion detection logic 260 may then filter the events by combining a number of similar events into a single event, thereby reducing the overall data set size.

Forwarding logic 270 may receive information from other devices, such as intrusion detection logic 260. Forwarding logic 270 may determine whether to pass received information to other devices, such as user device 130. Forwarding logic 270 may make the determination on whether to pass a data stream to user device 130 based on a set of stored rules. Based on the stored rules, forwarding logic 270 may pass the data stream or defer the decision on whether to forward the data stream to the application (i.e., user device 130) to CMS 140. For example, forwarding logic 270 may include a set of IF-THEN-ELSE statements, such as a set a computer aided software engineering (CASE) statements in C, where all decision trees may lead to passing the data stream to user device 130 or deferring the decision to CMS 140. In some implementations, forwarding logic 270 may perform an error recovery procedure on the received data stream by removing the malicious content.

Input/output device 280 may include any conventional mechanism that permits an operator to input information to interface device 120, such as a keyboard, a mouse, a microphone, a pen, a biometric input device, such as voice recognition device, etc. Input/output device 280 may also include any conventional mechanism that outputs information to the operator, including a display, a printer, a speaker, etc.

Returning to FIG. 1, each user device 130 may include any type of computer system, such as a personal computer (PC), laptop, etc., that is capable of transmitting and receiving voice and/or data communications via network 110. User devices 130 may also include non-computer or non-PC based devices, such as a network appliance, a set top box for interfacing between a monitor (e.g., a television) and a network, a television-type Internet access device, or some other type of device that is capable of transmitting and receiving information to/from network 110.

Figure 3:
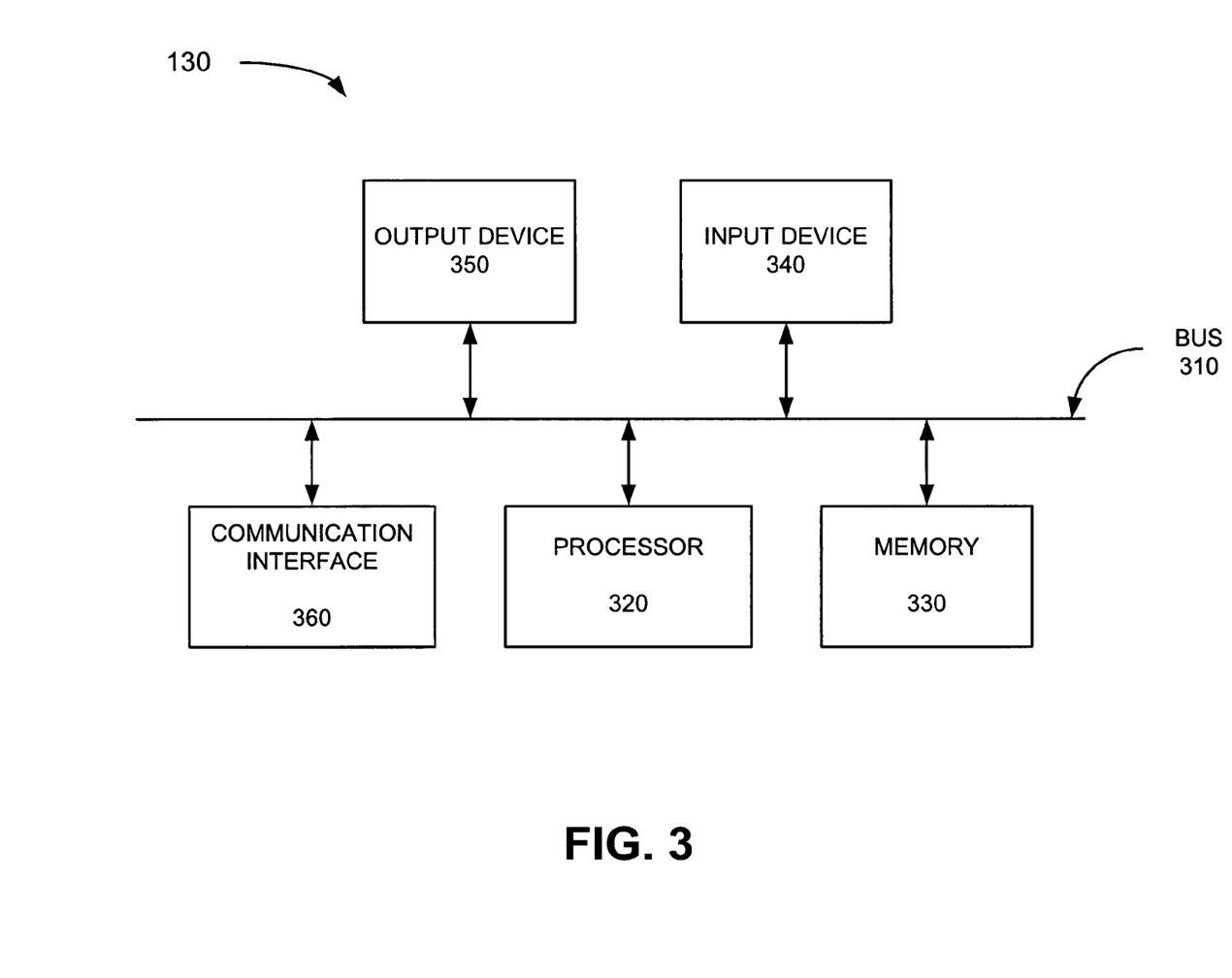
FIG. 3 illustrates an exemplary configuration of a user device of FIG. 1 in an implementation consistent with the present invention.

FIG. 3 illustrates an exemplary configuration of user device 130 of FIG. 1 in an implementation consistent with the present invention. As illustrated, user device 130 includes a bus 310, a processor 320, a memory 330, an input device 340, an output device 350, and a communication interface 360. Bus 310 permits communication among the components of user device 130.

Processor 320 may include any type of conventional processor or microprocessor that interprets and executes instructions. Memory 330 may include a RAM or another type of dynamic storage device that stores information and instructions for execution by processor 320; a ROM or another type of static storage device that stores static information and instructions for use by processor 320; and/or some type of magnetic or optical recording medium and its corresponding drive.

Input device 340 may include any conventional mechanism that permits an operator to input information to user device 130, such as a keyboard, a mouse, a pen, voice recognition and/or biometric mechanisms, and the like. Output device 350 may include any conventional mechanism that outputs information to the operator, including a display, a printer, a speaker, etc. Communication interface 360 may include any transceiver-like mechanism that enables user device 130 to communicate with other devices and/or systems, such as interface device 120, integrated applications, traditional telephony systems, etc., via wired, wireless, and/or optical connections.

In alternative implementations, user device 130 and interface device 120 may be integrated into a single device. For example, some or all of the functions performed by user device 130, such as executing application programs associated with receiving and transmitting information via network 110, may be performed by interface device 120 and vice versa. In other words, the security functions described above with respect to interface device 120 may be built into a user device 130, such as a PC-based device, a network appliance, a set top box, a TV-type device, etc.

Returning to FIG. 1, CMS 140 may provide security related information to users and their corresponding interface devices 120. For example, CMS 140 may analyze patterns of attacks to create rules and signatures associated with attacks.

CMS 140, consistent with the present invention, may provide the particular rules to interface devices 120 on a subscription basis. That is, a user associated with user device 130 and interface device 120 may subscribe to security services with CMS 140. The security services provided by CMS 140 may include multiple service levels. The user may select the particular service level based on the particular user's requirements. In this manner, a user may determine the desired level of security he/she wishes to obtain and may subscribe to the corresponding service level with CMS 140. In addition, CMS 140 may adjust/modify the rules applied by firewall 240 in a real-time or near real-time manner, as described in more detail below.

Users may also request security information/services from CMS 140 on an as-needed basis instead of subscribing for security services with CMS 140. In this case, the user may pay for security-related services when requesting information from CMS 140. In either case (i.e., subscription-based or request-based), CMS 140 may download the security related information for use by interface devices 120. The security information may include rules that may be used by firewall 240, intrusion detection logic 260 and forwarding logic 270 to perform the functions described above. CMS 140 may periodically update these rules. For example, when new viruses are detected, CMS 140 may modify or provide new rules to firewall 240 that may then be used to detect the new virus. CMS 140 may provide these updated rules at predetermined intervals or as needed.

CMS 140, as discussed above, may support a number of service levels. For example, a user may subscribe to any one of a number of security levels, e.g., up to four or more service levels, such as "bronze," "silver," "gold" and "platinum." Each service level may have its own set of rules and CMS 140 may download the appropriate rules to interface devices 120 based on their respective subscription levels. For example, the platinum level may represent the highest security level and include the most stringent rules associated with allowing received data to be forwarded to user devices 130. CMS 140 may provide these rules to interface devices 120 using VPN tunnels established with the respective interface devices 120.

CMS 140 may also represent a service point of decision for making routing decisions on behalf of interface devices 120. For example, CMS 140 may receive information from an interface device 120 and determine whether a particular data stream received by interface device 120 should be forwarded to a user application being executed by user device 130. CMS 140 may be a provider-based point of decision associated with a particular service provider associated with routing data via network 110. CMS 140 may also be associated with multiple service providers or may be associated with no particular service provider. In each case, CMS 140 may gather information and assess service wide patterns, such as attack patterns, using known correlation techniques. CMS 140 may include any combination of software/hardware based systems to assist the provider in gathering and assessing the information. A human operator of CMS 140 may also aid in determining the appropriate action, as described in more detail below. It should also be understood that CMS 140 may process data received from a number of interface devices 120 at the same time.

Server 150 may include any conventional server or computer-based system that provides information to user device 130 via its corresponding interface device 120. Server 150 may, for example, represent a company providing products such as video-on-demand, video-based training, downloadable music files or games, on-line gaming, on-line shopping or any other service/product over network 110.

As discussed previously, interface device 120 may perform a number of security-related functions associated with receiving data over network 110. In implementations consistent with the present invention, the functions performed by the components/modules of interface device 120 may be performed by one or more processors executing sequences of instructions contained in a computer-readable medium, such as storage device 220. In alternative embodiments, each of the modules/components may include hardwired circuitry and/or any combination of hardware, firmware and software. Thus, the present invention is not limited to any specific combination of hardware circuitry and software.

Exemplary Processing

Figure 4:
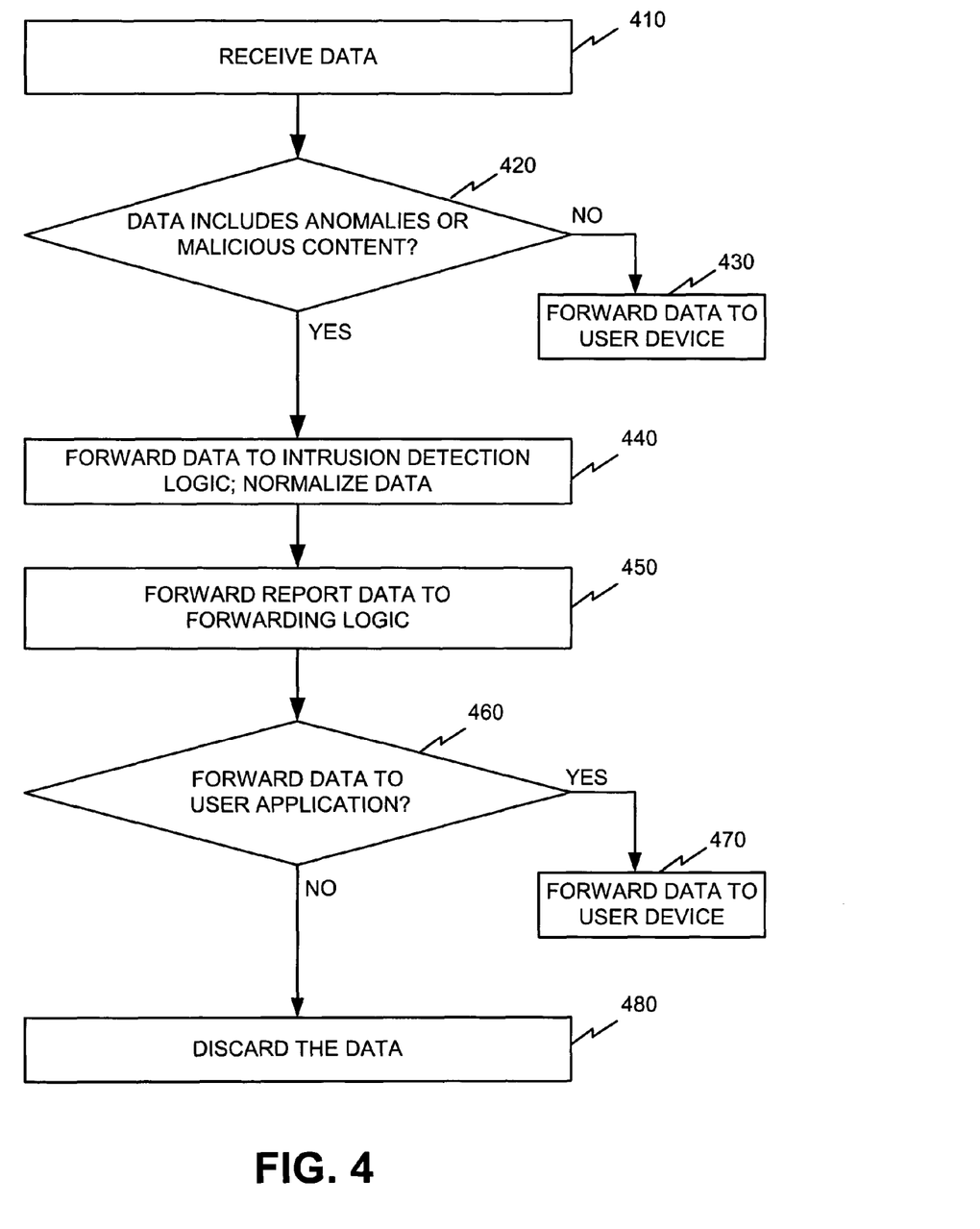
FIG. 4 is a flow diagram illustrating exemplary processing by an interface device of FIG. 1 in an implementation consistent with the present invention.

FIG. 4 is a flow diagram, consistent with the present invention, illustrating exemplary processing associated with system 100. Processing may begin with interface device 120 receiving data intended for user device 130 via communication interface 230 (act 410). For example, the data may be received from an external device, such as server 150 or another user device 130, via network 110. The data may represent a response to a request for information made by user device 130 to server 150. For example, server 150 may represent a provider offering a service or product, such as video-on-demand, music files, on-line games, interactive shopping, downloadable games, etc. In response to a request from user device 130, server 150 may provide the requested information to interface device 120 via network 110. Communication interface 230 may forward the data to firewall 240.

Firewall 240 may receive the data and apply a predetermined set of rules to determine whether the data contains anomalies or malicious content (act 420). For example, as described previously, firewall 240 may include an anti-virus module. The anti-virus module may scan the incoming data to determine whether the received data includes a virus or other attack-related data. The anti-virus module may use signature-based techniques and/or heuristic techniques to detect viruses and/or other malicious content. For example, heuristic-based techniques may look for common text, transmission characteristics or content patterns that were previously shown to be related to a virus or malicious content.

The anti-virus module may also use "rough set logic" to detect viruses and/or other malicious content. As understood by those of ordinary skill in this art, rough set logic may look at every piece of content it receives to develop an artificial intelligence (AI) type engine to analyze data received at a later time. For example, the rough set logic may examine all the bytes of a received data stream and "score" the data stream to determine whether the data is appropriate for the user. As additional data streams are received, the rough set logic continues to refine its scoring process based on information gained from previous data streams. In this manner, the rough set logic continues to update and refine its processing to identify malicious content. In any of the above cases (i.e., using rules-based techniques, heuristic-based techniques, rough set logic or any combination of these or other techniques), if the anti-virus module does not detect anomalies or malicious content, firewall 240 forwards the data stream to user device 130 (act 430).

However, if the anti-virus module detects anomalies or malicious content, firewall 240 may forward the data stream to intrusion detection logic 260 (act 440). Intrusion detection logic 260 receives the data stream from firewall 240 and may filter/normalize the received data (act 440). For example, intrusion detection logic 260 may count the number of packets, number of bytes, etc., of the received data stream that includes anomalies. Intrusion detection logic 260 may also provide the normalized data in a concise report format. Intrusion detection logic 260 may then forward the filtered/normalized report data to forwarding logic 270 (act 450).

Forwarding logic 270 receives the report data from intrusion detection logic 260 and determines if the data steam associated with the report data should be forwarded to its intended destination (e.g., user device 130) (act 460). Forwarding logic 270 may use a pre-stored set of rules to determine if the data should be passed to user device 130. In the event that the data is to be forwarded to user device 130 (i.e., indicating that the anomalies are not related to malicious content), forwarding logic 270 forwards the data to user device 130 (act 470).

If forwarding logic 270 determines that the data is not to be forwarded to user device 130 (i.e., indicating that the anomalies are related to malicious intent and are not for legitimate purposes), the data may be discarded (act 480). That is, forwarding logic 270 may delete the received data stream. In implementations consistent with the present invention, the received data stream may be stored or buffered in a memory, such as storage device 220, while the data stream is being examined for malicious content. In an exemplary implementation, the data stream may be "quarantined" in a memory while the data is being examined. That is, the data stream may be stored for a temporary period of time until the examination determines whether the data contains malicious content. While the data is quarantined, the data may be separated from other "good" data.

Figure 5:
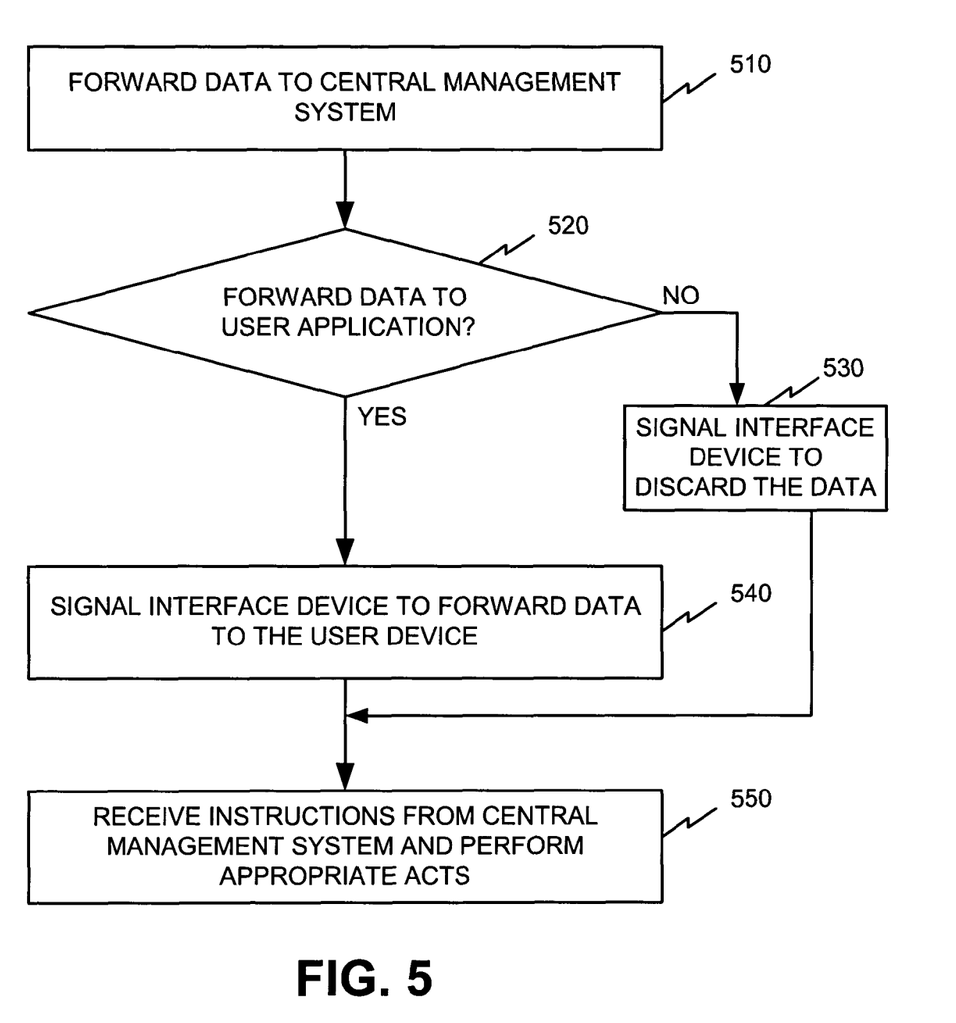
FIG. 5 is a flow diagram illustrating exemplary processing performed by an interface device and central management system of FIG. 1 in an alternative implementation consistent with the present invention.

In an alternative implementation consistent with the present invention, forwarding logic 270 may defer the decision on whether to forward the data to user device 130 to an external entity, such as CMS 140. In this case, forwarding logic 270 forwards the report information to CMS 140 (act 510; FIG. 5). Interface device 120 may use a secure tunnel/connection established by VPN gateway 250 when communicating with CMS 140. It should be understood that CMS 140 may not receive the actual data stream from interface device 120, but may receive report information with pertinent data that may be used by CMS 140 to determine whether the data stream contains malicious content. The actual data stream may by stored on interface device 120. In some implementations, however, the actual data stream may be forwarded to CMS 140.

CMS 140 may then analyze the report data based on predetermined rules to determine whether the data should be forwarded to user device 130 (act 520). CMS 140 may automatically make this determination based on predetermined rules stored in CMS 140. A human operator of CMS 140 may also assist in determining whether the data should be forwarded to user device 130.

If CMS 140 determines that the data should not be forwarded to user device 130, CMS 140 signals interface device 120 to discard the data (act 530). If CMS 140 determines that the data may be forwarded to user device 130, CMS 140 signals interface device 120 to forward the data to user device 130 (act 540). Interface device 120 receives the indication from CMS 140 and acts accordingly (act 550). That is, interface device 120 either forwards the data to user device 130 or drops the data, based on the instructions from CMS 140.

In summary, interface device 120 provides a number of security functions in a single, modular device. The services provided may include firewall services, intrusion detection services, data forwarding services and VPN related services. In addition, interface device 120 operates in an efficient, seamless manner with respect to user device 120. Therefore, the end user experiences no loss in satisfaction associated with receiving information via network 110 and executing applications.

Systems and methods consistent with the present invention provide a flexible system and method for providing increased network security. An advantage of the invention is that interface device 120 has the capability to identify and respond to widespread attack vectors across the Internet. In addition, the invention is scalable across a large number of customers (i.e., interface devices 120). Further, multiple central management systems 140 may be distributed to provide load balancing for a large number of customers. The invention also provides a layered security defense for set top applications or programs that process data on a peer-to-peer basis, a distributed network, a grid-based network, a LAN, a wireless network, or any other similar network. Another advantage of the invention is that interface device 120 and CMS 140 provide for cost-effective mechanisms to update and maintain security for users as new security threats are identified.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described mainly with respect to a separate interface device 120 being used to process data for a user device 130. However, as discussed above, the functions of the interface device 120 and user device 130 may be combined in implementations consistent with the present invention. In addition, it should be understood that the present invention is not limited to any particular combination of hardware/software/firmware. Further, actions described as being performed by a particular device, module or logic in interface device 120 may alternatively be performed by another device/module/logic or may be performed by a single element. Lastly, aspects of the present invention have been described as series of acts in relation to FIGS. 4 and 5. It should be understood that the order of these acts may vary in other implementations of the present invention. Moreover, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A device, comprising:
   at least one interface configured to receive data transmitted via a network;
   a firewall configured to:
   receive data from the at least one interface,
   determine whether the data potentially contains malicious content, and
   identify first data in the received data that potentially contains malicious content;
   intrusion detection logic configured to:
   receive the first data, and
   generate report information based on the first data; and
   forwarding logic configured to:
   receive the report information,
   forward the first data for processing by a user application when the report information indicates that the first data does not contain malicious content; and
   forward the report information to a remote central management system when the report information indicates that the first data potentially contains malicious content, the report information allowing the remote central management system to make a forwarding decision on behalf of the device.

2. The device of claim 1, further comprising:
   a virtual private network gateway configured to establish a secure connection with the remote central management system.

3. The device of claim 1, wherein the firewall comprises anti-virus logic configured to examine a data stream for viral signatures using at least one of a signature-based technique, a heuristic technique or a rough set logic technique.

4. The device of claim 3, wherein the anti-virus logic is further configured to identify unsolicited messages.

5. The device of claim 1, further comprising:
   a processing device executing the user application, the user application being associated with at least one of video-on-demand, video-based training, on-line gaming, on-line shopping, downloading music files or downloading games.

6. The device of claim 1, wherein at least one of the firewall, the intrusion detection logic or the forwarding logic is configured to receive rule-based processing information from an external device via the network.

7. The device of claim 6, wherein at least one of the firewall, intrusion detection logic or forward logic is further configured to receive updated rule-based processing information from the external device.

8. In a network device configured to receive data transmitted over a network, a method, comprising:
   receiving data transmitted via the network;
   identifying first data that may contain malicious content;
   generating report information based on the first data;
   forwarding the report information to an external device when the report information indicates that the first data potentially contains malicious content, the report information allowing the external device to make a forwarding decision on behalf of the network device; and
   forwarding the first data to the user device when it is determined that the first data does not contain malicious content.

9. The method of claim 8, further comprising:
   establishing a virtual private network connection to the external device, and wherein the forwarding the report information includes:
   forwarding the report information over the virtual private network connection.

10. The method of claim 8, further comprising:
   receiving, from the external device, information indicating whether the first data is to be forwarded to the user device; and
   dropping the first data when the information indicates that the first data is not to be forwarded.

11. The method of claim 8, wherein the identifying comprises:
  examining the received data for viruses using at least one of a signature-based technique, a heuristic technique or a rough set logic-based technique.

12. The method of claim 8, wherein the identifying comprises:
  identifying spam.

13. A non-transitory computer-readable medium having stored thereon a plurality of sequences of instructions, said sequences of instructions including instructions which, when executed by a processor, cause the processor to:
  receive data transmitted via a network;
  receive at least one set of rules from an external device, the at least one set of rules being associated with processing the received data;
  determine whether the data may contain malicious content using a first set of rules;
  identify first data that may contain malicious content based on the determining;
  generate report information based on the first data;
  forward the first data for processing by a user application when the report information indicates that the first data does not contain malicious content; and
  forward the report information to an external device when the report information indicates that the first data potentially contains malicious content, the report information allowing the external device to make a forwarding decision on behalf of the processor.

14. The computer-readable medium of claim 13, wherein the instructions further cause the processor to:
  establish a virtual private network tunnel with the external device and send the report information over the virtual private network tunnel.

15. The computer-readable medium of claim 13, wherein when identifying first data that may contain malicious content, the instructions cause the processor to identify a virus using at least one of a signature-based technique, a heuristic technique or a rough set logic-based technique.

16. The computer-readable medium of claim 15, wherein when identifying first data that may contain malicious content, the instructions cause the processor to identify spam.

17. The computer-readable medium of claim 13, wherein the instructions further cause the processor to execute the received data, the data being associated with at least one of video-on-demand, video-based training, on-line gaming, on-line shopping, downloading music files or downloading games.

\* \* \* \* \*